United States Patent
Zhao et al.

(10) Patent No.: US 11,983,735 B1
(45) Date of Patent: May 14, 2024

(54) RECOMMENDATION CAMPAIGNS BASED ON PREDICTED SHORT-TERM USER BEHAVIOR AND PREDICTED LONG-TERM USER BEHAVIOR

(71) Applicant: Pinterest, Inc., San Francisco, CA (US)

(72) Inventors: Bo Zhao, Redwood City, CA (US); John William Gupta Egan, Mountain View, CA (US); Burkay Birant Orten, Belmont, CA (US); Koichiro Narita, San Francisco, CA (US); Samuel Seth Weisfeld-Filson, Richmond, CA (US)

(73) Assignee: Pinterest, Inc., San Francisco, CA (US)

( * ) Notice: Subject to any disclaimer, the term of this patent is extended or adjusted under 35 U.S.C. 154(b) by 278 days.

(21) Appl. No.: 15/612,851

(22) Filed: Jun. 2, 2017

(51) Int. Cl.
*G06Q 30/0251* (2023.01)
*G06N 20/00* (2019.01)

(52) U.S. Cl.
CPC ......... *G06Q 30/0251* (2013.01); *G06N 20/00* (2019.01)

(58) Field of Classification Search
CPC .............. G06Q 30/02; G06Q 30/0202; G06Q 30/0246; G06Q 20/4016; G06Q 10/04; G06Q 10/06314; G06Q 10/06315; G06Q 10/067; G06Q 20/065; G06Q 20/0655; G06Q 20/29; G06Q 20/367; G06Q 20/38215; G06Q 20/389; G06Q 20/401; G06Q 20/405; G06Q 2220/00; G06Q 2220/12; G06Q 2220/18; G06Q 30/0201; G06Q 30/0205; G06Q 30/0206; G06Q 30/0247; G06Q 30/0254; G06Q 30/0273; G06Q 30/0276; G06Q 30/06; G06Q 40/04; G06Q 40/10; G06Q 50/01; G06Q 50/06; G06Q 50/184; G06Q 30/0207–0277; G06N 20/00
See application file for complete search history.

(56) References Cited

U.S. PATENT DOCUMENTS

| | | | |
|---|---|---|---|
| 9,756,487 B1* | 9/2017 | Ghadialy | H04M 3/42382 |
| 10,552,863 B1* | 2/2020 | Sadagopan | G06N 7/01 |
| 2007/0260624 A1* | 11/2007 | Chung | G06Q 30/02 |
| 2016/0042299 A1* | 2/2016 | Liang | G06F 16/24578 706/12 |

* cited by examiner

Primary Examiner — Chinyere Mpamugo
(74) Attorney, Agent, or Firm — Athorus, PLLC (57) ABSTRACT

Described are systems and methods for generating recommendation campaigns that optimize for both a desired short-term user behavior and a desired long-term user behavior. In comparison to existing techniques that focus on targeting advertisements or recommendations to specific individuals with a single goal of receiving an interaction with the advertisement from that individual (i.e., a desired short-term behavior), the disclosed implementations consider the long-term user behavior, such as increased visits to a website during a long-term rage, and generate a recommendation campaign that also optimizes for that desired long-term user behavior.

15 Claims, 7 Drawing Sheets

RECOMMENDATION CAMPAIGNS BASED ON PREDICTED SHORT-TERM USER BEHAVIOR AND PREDICTED LONG-TERM USER BEHAVIOR

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

In addition, many third parties (e.g., companies, website, etc.), are using computing devices and electronic communication to advertise to users, compete for user attention, etc. For example, third parties often send follow-up messages, electronic mail, text messages, etc. after a user has viewed a product, subscribed to a mailing list, purchased an item, or otherwise provided their contact information to the third party. Users are often inundated with third party communications and, as a result, ignore many of those communications, or request that the third party stop sending the communications, often referred to as "unsubscribing" from the third party and/or the third-party communication.

DETAILED DESCRIPTION

This disclosure describes systems and methods for generating recommendation campaigns that optimize for both a desired short-term user behavior and a desired long-term user behavior. In comparison to existing techniques that focus on targeting advertisements or recommendations to specific individuals with a single goal of receiving an interaction with the advertisement from that individual (i.e., a desired short-term user behavior), the disclosed implementations consider a desired long-term user behavior, such as increased visits to a website during a long-term rage, and generate a recommendation campaign that also optimizes for that desired long-term user behavior.

As an example, existing systems may generate a recommendation campaign that sends communications to a user on a defined periodic basis (e.g., every day) with the desired result of the user interacting with one or more of those communications. The targeted aspect of those communications may consider the preferences of the user to determine content for the communications sent as part of the recommendation campaign. However, the basis of the recommendation campaign and the frequency of the communications is solely focused on producing a desired short-term user behavior—the user interacting with the communication.

In comparison, the disclosed implementations generate recommendation campaigns that factor in both a desired short-term user behavior and a desired long-term user behavior. For example, a machine learning system may be trained based on user profiles of a corpus of users and generate user models representative thereof. Each user model may represent a plurality of similar user profiles and be utilized by a trained machine learning system to predict user behavior of other users having similar user profiles. For example, a trained machine learning system may utilize a developed user model to predict a short-term user behavior and predict a long-term user behavior of a user in response to different recommendation campaigns (e.g., content, channel, frequency). The trained machine learning system may then be used to generate a recommendation campaign for the user based on a desired short-term user behavior and a desired long-term user behavior. For example, the desired short-term user behavior may be an interaction by the user during a short-term range (e.g., within 3 days of a communication being delivered to the user) with one or more of the communications sent to the user as part of the recommendation campaign. The desired long-term user behavior may be a percentage increase in daily visits to a website during a long-term range (e.g., during the time range of 30-45 days after initiation of the recommendation campaign). Based on the user profile of the user, the desired short-term user behavior, and the desired long-term user behavior, the trained machine learning system produces a recommendation campaign for the user that has the highest likelihood of achieving the desired short-term user behavior and the desired long-term user behavior.

As the recommendation campaign is conducted, the actual short-term user behavior and long-term user behavior is monitored, the user profile updated based on the actual user behaviors, and the relevant user model(s) developed by the machine learning system may be updated to consider the actual user behavior exhibited in response to the recommendation campaign. By updating the user profile and user model developed by the machine learning system, the accuracy of the machine learning system continues to improve and thus, the accuracy of the recommendation campaigns determined for other users will likewise continue to improve.

As used herein, a "short-term range" for the desired short-term user behavior may be any defined period of time that occurs after initiation of a recommendation campaign, any defined period of time following completion of a recommendation campaign, or any defined period of time following delivery of a communication that is part of the recommendation campaign. For example, the short-term range may be the two days immediately following the delivery of each communication as part of the recommendation campaign. In such an example, the machine learning system may predict a user behavior during those two days that will be exhibited in response to a particular communication of the recommendation campaign and the system may generate a recommendation campaign based on a desired short-term user behavior that is predicted to occur during those two days after the communication of the recommendation campaign is sent to the user. The user's actual behavior during those two days after initiation of the recommendation campaign is considered the actual short-term user behavior.

A "long-term range" for a desired long-term user behavior may be any defined period of time that begins and ends following a defined period of time after initiation of a recommendation campaign, any defined period of time that begins and ends following a defined period of time after completion of a recommendation campaign, or any defined period of time following a defined period of time after delivery of a communication that is part of the recommendation campaign. For example, the long-term range may be a period of time that is 30-37 days after initiation of the recommendation campaign. In such an example, the machine learning system may predict a user behavior during those 30-37 days that will be exhibited in response to a particular recommendation campaign and the system may generate a recommendation campaign based on a desired long-term user behavior that is predicted to occur during those 30-37 days after initiation of the recommendation campaign. The user's actual behavior during those 30-37 days after initiation of the recommendation campaign is considered the actual long-term user behavior.

A recommendation campaign, as discussed herein, may indicate any combination, frequency and/or type of communication that may be sent to a user. For example, a generated recommendation campaign for a user may indicate one or more of a type or types, also referred to as channels, of communication (e.g., electronic mail, push communication, short messaging service (SMS) message, multimedia messaging service (MMS) message, text message, telephone call, computer based notification, paid advertising communication, in-application message, physical mail communication, etc.) that are to be utilized to send communications for presentation to a user, a frequency of communications to be sent to the user during a recommendation campaign, a day or days of the week in which communications are to be sent to the user, a time or times (or time range) during which communications are to be sent to the user, a location or locations of the user that are to be used to determine when to send communications to the user, a device type in use by the user to determine when to send communications to the user, etc. Likewise, the recommendation campaign may specify the content or contents of the communications that are to be sent to the user. As discussed further below, each aspect of the recommendation campaign may be determined by a trained machine learning system based on the user profile, the desired short-term user behavior and/or the desired long-term user behavior to be exhibited by the user in response to the recommendation campaign.

While some examples discussed herein describe generation of a recommendation campaign that optimizes for both a desired short-term user behavior and a desired long-term user behavior in which the desired long-term user behavior is an increase in user activity (for example), in some implementations, the desired long-term user behavior may be that the long-term user behavior compared to the current actual user behavior of the user remain unchanged and/or that the user not unsubscribe to the service or third party for which the recommendation campaign was produced. In still other implementations, rather than or in addition to optimizing for a user behavior during the short-term range and/or the long-term range, the implementations may be used to optimize based on one or more constraints. For example, a constraint, such as sending no more than three communications during the campaign to a particular user, may be provided to the trained machine learning system and the trained machine learning system will generate a recommendation campaign that considers the constraint(s).

In some implementations, constraints may be at a user level and/or an aggregate level. For example, an aggregate level constraint may specify a maximum total volume of communications that can be sent by the system during a given period of time (e.g., twenty-four hours). Based on the provided constraint, the described implementations will balance the volume of communications among different recommendation campaigns for different users to achieve the desired short-term user behaviors and desired long-term user behaviors while complying with the provided constraint(s).

For purposes of discussion, an "object identifier," as used herein, is a collection of one or more items of information that identifies an object based on a user's perspective, or context. The object identifier may include any combination of: a representation of an object, such as a graphical representation, audible representation, or other representation of the object; a context for the object as understood by the user; a description or annotation of the object provided by the user; static information about the object; supplemental information about the object; the set to which the object belongs (discussed below); the source of the object; any parent object identifier from which the object identifier was created; and any identification of other similar object identifiers. As will be appreciated, additional or fewer items of information may be included in an object identifier. In some implementations, annotations corresponding to the object may be obtained from other object identifiers and/or other sets that include similar object identifiers.

As discussed in further detail herein, a context represents information about an object as understood by the user. The context explains why the object is important to the user who created the object identifier. In some implementations, context(s) may be provided directly by the user or determined based on other information provided by or about the user, such as annotations. Static information about an object may be any information about the object that does not change. Such information may be provided by the user, by other users, by external sources, and/or by the methods and systems described herein.

The methods and systems described herein further enable users to manage, search for, share and discover objects by organizing object identifiers into "sets." For example, users may create one or more sets and object identifiers may be associated with those sets. Generally, a "set" is a collection of object identifiers created by a user. In one implementation, each set may include any number of object identifiers, including zero (a null set). An object identifier may be associated with one or many sets. In one implementation, an object identifier may only be associated with one set. Like object identifiers, sets may have a title, context and/or annotations. A set may also include a subject, such as travel, sports, animals, art, education, food and drink, etc.

In some implementations, object identifiers and/or sets of object identifiers may be maintained on a website that is associated with the recommendation service. Users can create object identifiers and add them to sets based on representations for objects provided or identified by the user or by adding existing object identifiers to their own set of object identifiers. An "object" may be anything that can be represented. For example, a user may create an object identifier for a television show, an image, a physical object, a sound, a web page, a location, a digital object, and the like. The user may also provide annotations to describe the identified object. Object identifiers created with representations provided or identified by a user are considered parent object identifier relationships. Object identifiers created based on existing object identifiers are considered child object identifiers, and may in some implementations inherit the annotations of the parent object identifier. An object identifier may have any number of parent and/or child object identifiers.

Figure 1:
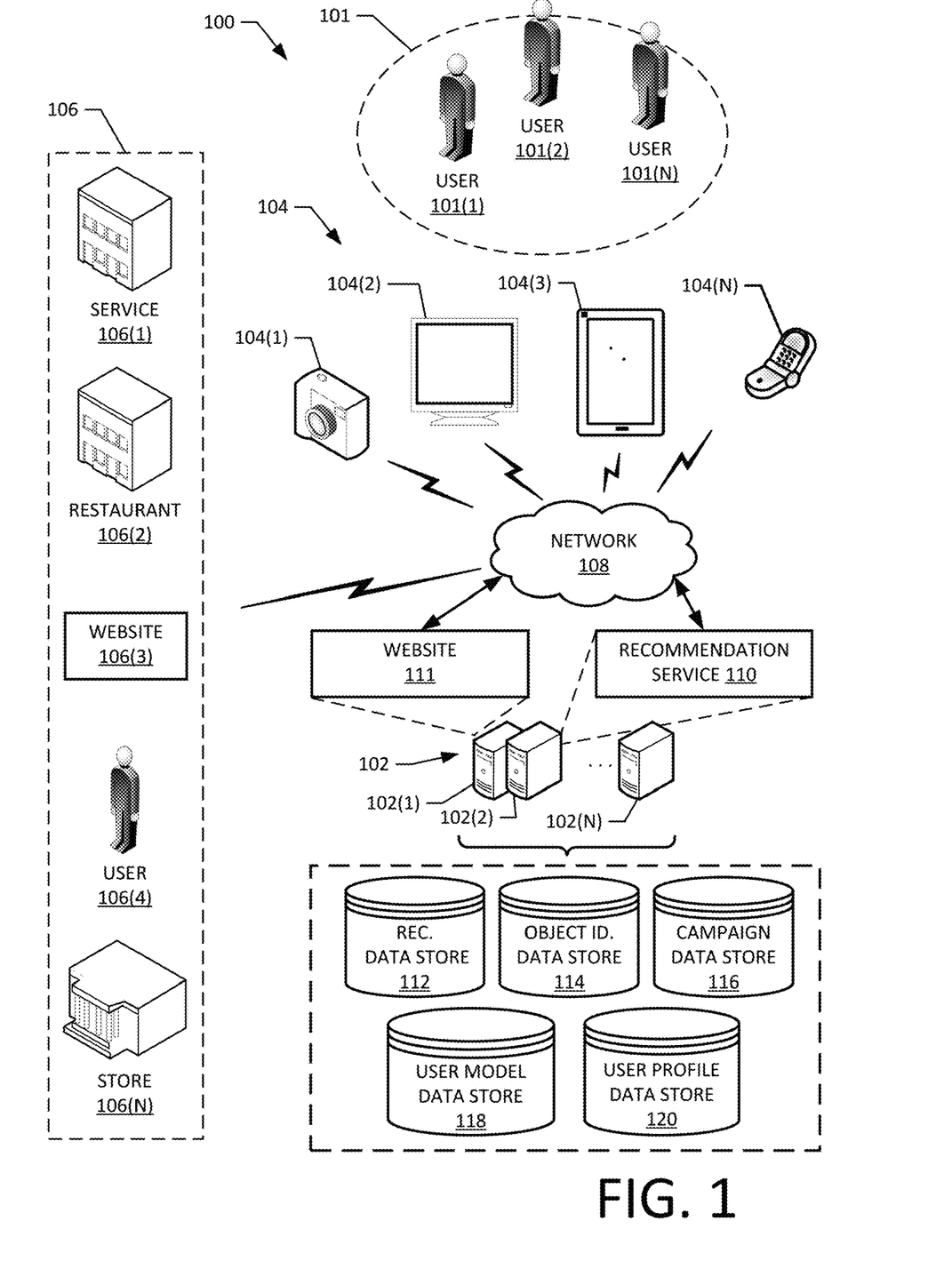
FIG. 1 is a pictorial diagram of an illustrative environment that includes a server system, third parties, users, and user devices communicatively connected via a network, according to described implementations.

FIG. 1 is a pictorial diagram of an illustrative environment 100 that includes users 101, such as users 101(1), 101(2)-101(N), a server system 102 that includes one or more server computers 102(1), 102(2)-102(N), one or more client devices 104, such as client devices 104(1), 104(2), 104(3)-104(N), and one or more third parties 106, such as a service offering 106(1), restaurant 106(2), website 106(3), user 106(4)-store 106(N) communicatively connected via a network 108. As will be appreciated, any number and/or type of server systems 102, client devices 104 and/or third parties 106 may be included in the environment 100 and those illustrated in FIG. 1 are only exemplary. Likewise, any number of users 101 may be included in the environment 100. For purposes of this discussion, the term "user" will be used herein to refer to an individual interacting with the server system 102, one or more third parties 106, a website 111, and/or the recommendation service 110 (discussed below).

The network 108 may include a local area network, a wide area network, such as a public switched telephone network (PSTN), a cable television network, a satellite network, a collection of networks, a public Internet protocol network, a private Internet protocol network, or a combination thereof. Moreover, the network 108 may be wired, wireless, or a combination of the two. The server system 102 may also include a recommendations data store 112, an object identifier data store 114, a campaign data store 116, a user model data store 118, and a user profile data store 120. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The recommendations data store 112, object identifier data store 114, campaign data store 116, user model data store 118, and user profile data store 120 may be integrated with the server system 102 or otherwise communicatively coupled with the server system 102, which may include a machine learning service, as discussed further below. For example, one or more of the recommendations data store 112, object identifier data store 114, campaign data store 116, user model data store 118, and user profile data store 120 may be located at a remote computing resource and communicatively coupled with the server system 102. In some implementations, the recommendations data store 112, object identifier data store 114, campaign data store 116, user model data store 118, and user profile data store 120 may include one or more CD-RW/DVD-RW drives, optical drives, hard disk drives, tape drives, or other storage devices that are utilized to store digital content and information. The server system 102, separately or together with the recommendations data store 112, object identifier data store 114, campaign data store 116, user model data store 118, and user profile data store 120, may provide a recommendation service 110 that generates recommendation campaigns for users and facilitates the delivery of communications to users 101 as part of the recommendation campaigns.

In some implementations, the server system 102 and/or the recommendation service 110 may generate recommendation campaigns and facilitate the delivery of communications as part of recommendation campaigns on behalf of a service or website 111 associated with the recommendation service 110. In some implementations, the server system 102 and/or recommendation service 110 may also be configured to communicate with one or more third parties to generate and send communications to users 101 as part of recommendation campaign on behalf of a third party 106. The third parties 106 may include any type of entity and/or individual(s) that may desire to have communications sent to users 101. For example, third parties 106 may include a service offering 106(1), such as local weather, car service, airline, etc., restaurants 106(2), websites 106(3), users 106(4) and stores 106(N), such as a toy store, grocery store, electronic commerce (e-commerce) store, book store, etc. Third parties 106 may be associated with a fixed location(s), such as their place of business, a location that may change (e.g., hiking guide, mobile health provider) depending on the third parties' current location, or no location at all (e.g., digital or virtual business). Digital or virtual businesses, such as websites 106(3), include any form of e-commerce or other digital offering.

For example, an e-commerce site may provide a shopping cart or purchase button, also referred to herein as a buy button, that can be used to initiate an action to purchase an object or view content on the website in response to a user interacting with a communication as part of the recommendation campaign. A user, when viewing a received communication sent on behalf an e-commerce site may interact with the communication and have the user device 104 present a desired portion of the e-commerce site to the user.

Returning to FIG. 1, client devices 104 may include personal computers, tablet computers, electronic reader devices, laptop computers, desktop computers, netbooks, personal digital assistants (PDA), portable gaming devices, wireless communication devices, such as smart phones or mobile handsets, set-top-boxes, game consoles, cameras, audio recorders/players, or any combination thereof. As will be described with regard to the implementations shown herein, the server system 102 is configured to exchange data and information, including information about users, sets, collections, representations, object identifiers, and other like information with the client device 104. For example, the recommendation service 110 may interact via the server system 102 to determine a user's location, provide recommendations to a user based on the user's current location and/or the client device 104 type, etc. As another example, the recommendation service 110 may monitor each of the users 101 interaction preferences with the website 111 and develop corresponding user profiles for each user 101. Users may also view and supplement their associated user profile to provide additional information or, as appropriate, remove information. For example, a user may provide their name, mailing address, age, gender, and/or other demographic information as part of their user profile.

As will be appreciated, the website 111 may have thousands or millions of associated users 101 and may develop and maintain user profiles for each respective user. Such user profiles may be maintained in the user profile data store 120 and accessible to the recommendation service 110 and/or the user associated with the user profile. Likewise, the users may interact with other users via the website 111, create and/or share object identifiers, create and/or share sets of object identifiers, purchase items, etc.

The recommendations data store 112 may store communications or recommendations that may be sent to different users as part of one or more recommendation campaigns. In some implementations, the recommendations may be in the form of electronic mail, text messages, etc. Likewise, the content of the recommendations may vary widely and be applicable to different users 101 based on their respective user profiles. In some implementations, the recommendations or communications sent to a client device associated with a user as part of a recommendation campaign may include object identifiers, uniform resource locators (URLs) to different pages of the website 111, etc.

The object identifier data store 114 maintains information about each object identifier that is included on the website 111 or otherwise accessible to the recommendation service 110 and/or users 101. As will be appreciated, an object identifier may be created by a user 101, a third party 106, the recommendation service 110 and/or the website 111.

As discussed further below, the user model data store 118 maintains a group of user models developed by the recommendation service 110 based on the user profiles and actual user behavior recorded and maintained in the user profile data store 120. For example, the recommendation service 110 may determine similarities between user profiles and generate user models representative of similar user profiles. User models representative of groups of user profiles may be based on similar aspects, e.g., demographics, browse history of the website 111, browse frequency of the website 111, purchase history, etc. As discussed further below, the user profiles and/or user models may be utilized as seed values to the recommendation service 110 to predict a user behavior based on a particular recommendation campaign.

The campaign data store 116 stores recommendation campaign information for different users that is utilized by the recommendation service to facilitate delivery of communications to users as part of the recommendation campaign. For example, recommendation campaign information for a user that is maintained in the campaign data store may indicate the channel (e-mail, push communications, telephone calls, etc.), frequency, time(s) of day, day(s) of week, content of the communication, etc., that is to be used as part of a generated recommendation campaign for a user or group of users.

The user profiles data store 120 stores information about users 101 of the recommendation service 110. Any type of information may be stored in the user profile data store 120. For example, user profile information, such as attributes, name, address, gender, browse history, object identifier history, annotation history, social networks and/or friends with which the user 101 interacts, and the like may be stored in the user profile data store 120. User profile information may be provided directly by users 101 and/or collected from users 101 of the client devices 104 when interacting with the website 111 (e.g., clickstream data as the user explores the website 111), when viewing, creating, or interacting with object identifiers, and/or when sharing information with friends or social communities through the website 111. In some implementations, user information may be obtained from third parties. For example, user profile information may be obtained from a third party with which the user is also affiliated (e.g., e-commerce web site, social network) and has agreed to allow sharing of some or all user profile information provided to that third party and/or collected by that third party. In some implementations, users 101 may choose to limit the amount of information included in their user profile, to limit access to their user profile information and/or to limit what information is shared, if any, from their user profile information.

Figure 2:
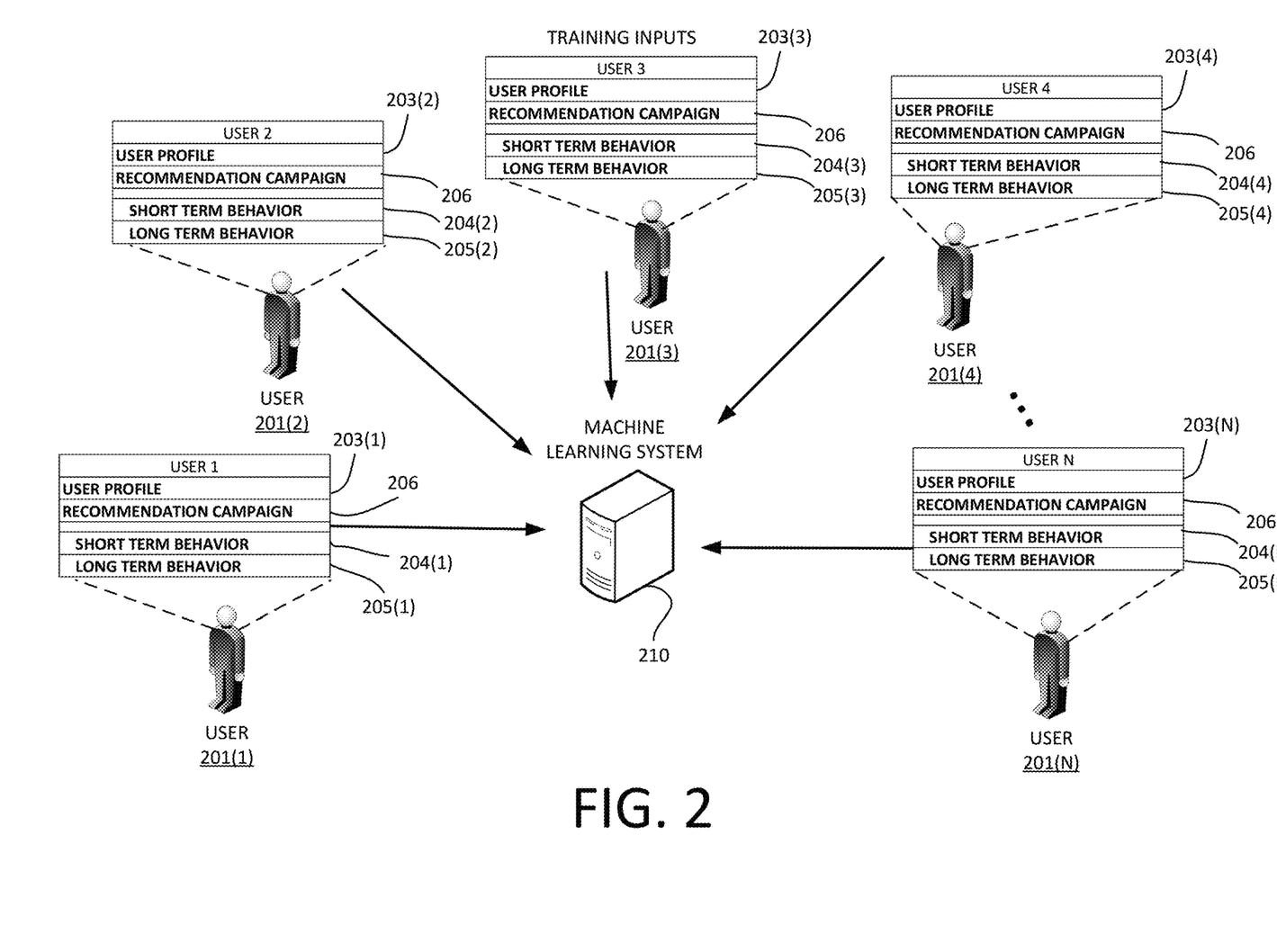
FIG. 2 is a block diagram of a machine learning system that receives user profiles as training inputs, according to described implementations.
Figure 3:
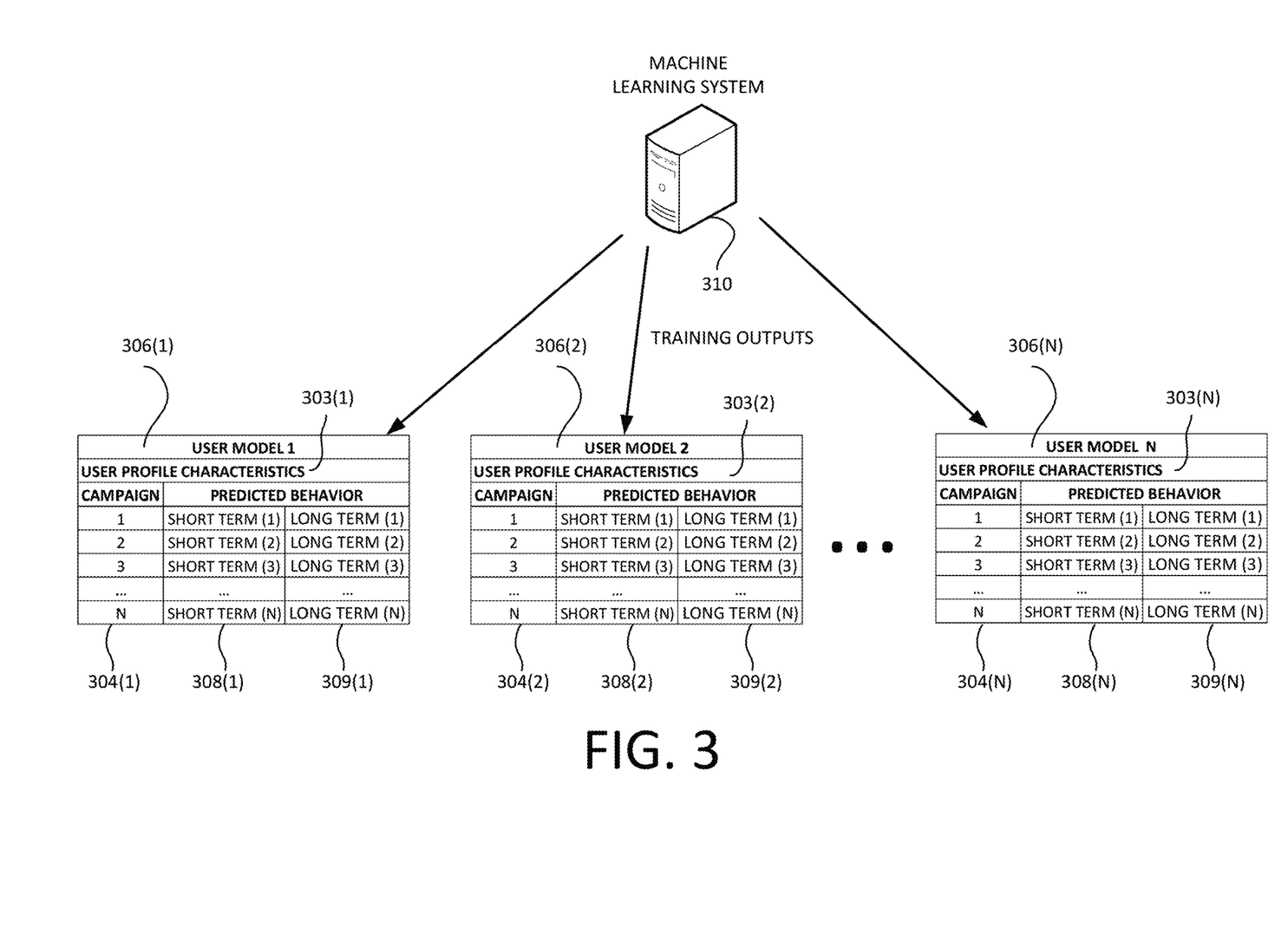
FIG. 3 is a block diagram of the machine learning system of FIG. 2, producing predicted outputs based on the training inputs, in accordance with described implementations.
Figure 4:
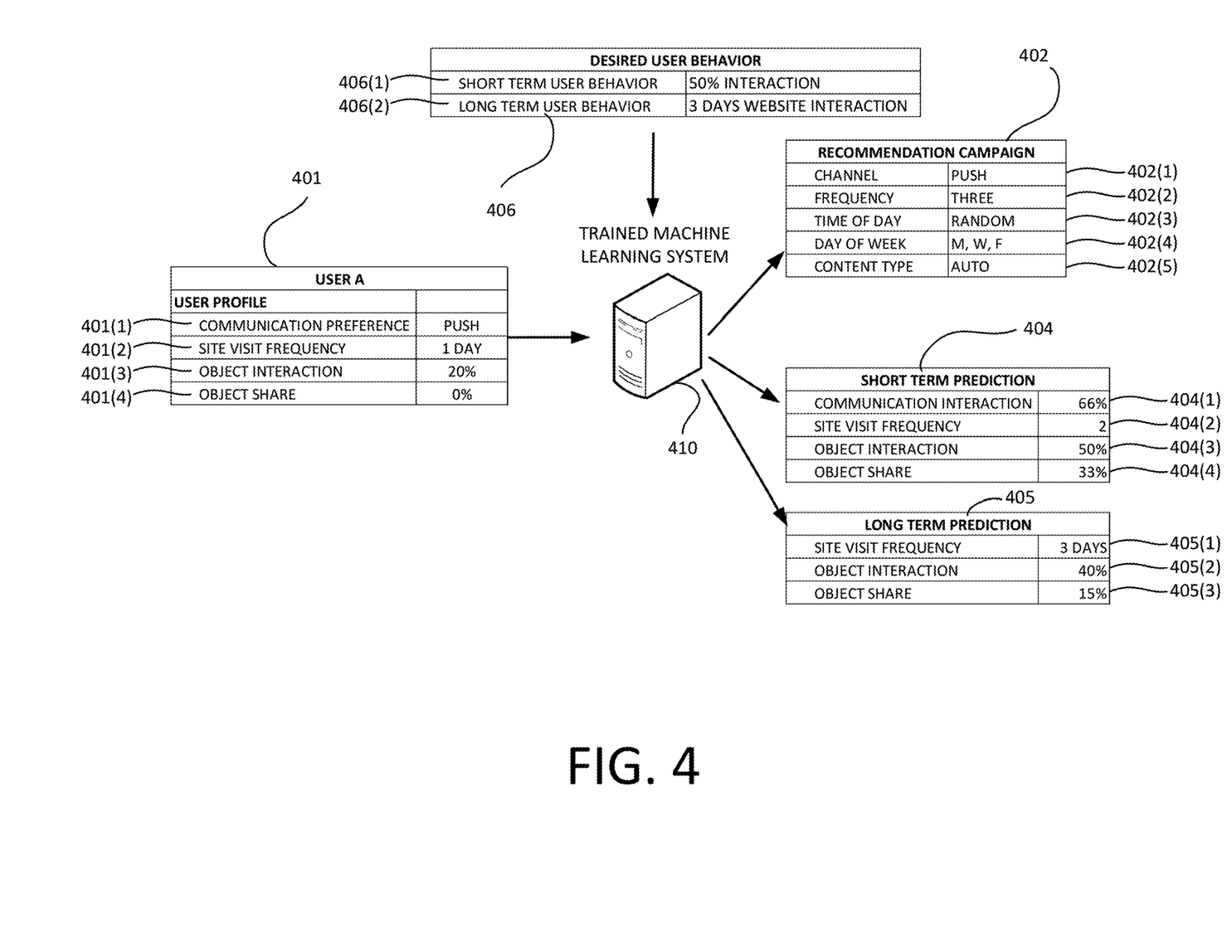
FIG. 4 is a block diagram of an example trained machine learning system that receives a user profile and desired user behaviors as inputs and produces a recommendation campaign and output predictions, in accordance with described implementations.

Referring to FIGS. 2-4, views of aspects of one recommendation service 110 (FIG. 1) for generating recommendation campaigns based on desired short-term user behavior and desired long-term user behavior in accordance with described implementations are shown. The illustrations corresponding to FIGS. 2-4 provide additional details of an example implementation for predicting short-term user behavior and long-term user behavior and generating a recommendation campaign that will encourage both a desired short-term user behavior and a desired long-term user behavior.

FIG. 2 illustrates a plurality of users 201(1), 201(2), 201(3), 201(4)-201(N) that interact with the website 111 (FIG. 1) or another service and have a corresponding user profile 203(1), 203(2), 203(3), 203(4)-203(N). As the users 201 interact with the website 111 and/or as recommendation service 210 sends them communications as part of recommendation campaigns, or otherwise, the actual short-term user behavior 204 and actual long-term user behavior 205 is monitored and included as part of the user profile 203 of the user. For example, as a recommendation campaign 206 is executed with respect to each of the users, the actual short-term user behavior 204 and actual long-term user behavior 205 is monitored and recorded in the respective user profiles of each user. For example, the actual short-term user behavior 204(1) and actual long-term user behavior 205(1) of the user 201(1) in response to communications that correspond to the recommendation campaign 206 are monitored and associated with the user profile 203(1). The actual short-term user behavior 204(2) and actual long-term user behavior 205(2) of the user 201(2) in response to communications that correspond to the recommendation campaign 206 are monitored and associated with the user profile 203(2). The actual short-term user behavior 204(3) and actual long-term user behavior 205(3) of the user 201(3) in response to communications that correspond to the recommendation campaign 206 are monitored and associated with the user profile 203(3). The actual short-term user behavior 204(4) and actual long-term user behavior 205(4) of the user 201(4) in response to communications that correspond to the recommendation campaign 206 are monitored and associated with the user profile 203(4). The actual short-term user behavior 204(N) and actual long-term user behavior 205(N) of the user 201(N) in response to communications that correspond to the recommendation campaign 206 are monitored and associated with the user profile 203(N). As will be appreciated, any number of users 201, user behaviors, recommendation campaigns, etc. may be maintained and provided as inputs to the recommendation service 210.

Because users vary in their preferences, interests, etc., actual user behavior exhibited by users in response to communications from a recommendation campaign will likewise vary. As a particular example, if the recommendation campaign 206 indicates that e-mail communications are to be sent to each user 201 on each of Monday, Wednesday, and Friday, in the morning that relates to sports, the actual short-term user behaviors and actual long-term user behaviors may vary for the different users. In this example, the actual short-term user behavior may be monitored during the short-term range (e.g., the two days immediately following the Friday after the last communication of the recommendation campaign is sent to the users 201). The actual long-term user behavior may be monitored during the long-term range (e.g., the 30-37 days following the Friday the last communication is sent). As the actual user behaviors are monitored, the respective user profiles are updated. The following Table 1 illustrates example excerpts of respective user profiles, and portions of the monitored and recorded user behavior for users 201(1), 201(2), 201(3), and 201(4) of FIG. 2 following a recommendation campaign. As will be appreciated, the user profiles, actual short-term user behavior, and actual long-term user behavior may include additional or fewer items of information.

TABLE 1

|  | USER 201(1) | USER 201(2) | USER 201(3) | USER 201(4) |
|---|---|---|---|---|
| USER PROFILE | | | | |
| COMMUNICATION PREFERENCE | EMAIL | PUSH | EMAIL, PUSH | PUSH |
| SITE VISIT FREQUENCY | 3 DAYS | 1 DAY | 5 DAYS | 1 DAY |
| OBJECT INTERACTION | 30% | 20% | 70% | 25% |
| OBJECT SHARE | 70% | 0% | 70% | 10% |
| ACTUAL SHORT TERM USER BEHAVIOR | | | | |
| COMMUNICATION RESPONSE | 50% | 0% | 100% | 100% |
| SITE VISIT FREQUENCY | 4 DAYS | 0 | 6 DAYS | 3 |
| OBJECT INTERACTION | 35% | 0% | 70% | 70% |
| OBJECT SHARE | 60% | 0% | 70% | 30% |
| ACTUAL LONG TERM USER BEHAVIOR | | | | |
| SITE VISIT FREQUENCY | 3 DAYS | 0 | 6 | 3 DAYS |
| OBJECT INTERACTION | 30% | 0% | 70% | 30% |
| OBJECT SHARE | 70% | 0% | 70% | 30% |

As illustrated, users with different user profiles may exhibit different actual short-term user behavior and/or actual long-term user behavior in response to a particular recommendation campaign. These different responses may be due to different interests, preferences, desires, etc. of the different users.

In accordance with the present disclosure, the user profile information, such as that illustrated in Table 1 may be provided to recommendation service 210, either in real time or in near-real time, as the data is collected in response to the recommendation campaign, the actual short-term user behavior may be provided upon completion of the short-term range, the actual long-term user behavior may be provided upon completion of the long-term range, and/or all of the information may be provided to the recommendation service 210 upon completion of the long-term range. Referring to FIG. 2, the details of the recommendation campaign 206 and the user profiles of each of the users 201(1), 201(2), 201(3), 201(4)-201(N) may be provided with or in addition to the respective user profiles 203 to the recommendation service 210, which in this example is a machine learning system, as a set of training inputs, and the actual short-term user behavior 204 and actual long-term user behavior 205 that is exhibited by each of the users 201 in response to the recommendation campaign(s) is provided to the recommendation service 210 as a set of training outputs corresponding to each user profile 203.

The recommendation service 210, which in this example includes a machine learning system, may be fully trained using a substantial corpus of user profiles and recommendation campaigns correlated with measured actual short-term user behavior and actual long-term user behavior to develop user models for different user profiles and to correlate user profiles with the developed user models. For example, some users may have similar user profiles and produce similar actual short-term user behavior and actual long-term user behavior in response to a recommendation campaign. Such types of users may be correlated and associated with a user model by the recommendation service and utilized by the recommendation service as representative of users having user profiles that are similar. After the machine learning system of the recommendation service 210 has been trained, and the user models developed, the machine learning system of the recommendation service 210 may be provided with a user profile and a set of desired short-term user behavior and desired long-term user behavior that is to be encouraged, and the machine learning system of the recommendation service 210 will generate a recommendation campaign that is predicted to produce the desired short-term user behavior and desired long-term user behavior from a user represented by the provided user profile in response to the recommendation campaign.

In some implementations, the machine learning system may receive an indication of a desired short-term user behavior and desired long-term user behavior and periodically process through different user models representative of different user profiles to develop different recommendation campaigns for users corresponding to user profiles represented by the different user models. The recommendation service 210 may then facilitate those recommendation campaigns and monitor the actual short-term user behavior and actual long-term user behavior, and periodically update the user profiles and retrain the machine learning system with the updated information.

Training of the machine learning system of the recommendation service 210 may include thousands or millions of user profiles and the actual short-term user behavior and actual long-term user behavior exhibited by each of the users associated with those user profiles in response to different communications from different recommendation campaigns. The recommendation campaigns may vary in any of a variety of ways including, but not limited to, duration, frequency, type, channel, time of day, day of week, content of the communications, the short-term range, and/or the long-term range. By varying the recommendation campaigns, the machine learning system can develop different predicted user behaviors for each user model of user profiles for different recommendation campaigns.

Referring to FIG. 3 illustrated are example user models 306 that may be output by the machine learning system of the recommendation service 310 in response to receiving training inputs. For example, the training inputs, as discussed above with respect to FIG. 2, may include multiple different user profiles and multiple different recommendation campaigns performed with respect to those different user profiles. The user models 306 produced by the machine learning system may classify the user profiles into different user models, such as user model 1 306(1), user model 2 306(2), user model 3 306(3)—user model N 306(N). Each user model may be representative of a group of user profiles having similar attributes and producing similar actual short-term user behavior and actual long-term user behavior in response to various recommendation campaigns. In some implementations, a user model may be representative of hundreds, thousands, or millions of similar user profiles. Likewise, in some implementations, a user profile may correspond to one and only one user model. In other implementations, a user profile may correspond to different user models, for example depending on the recommendation campaign to be produced.

Included in each user model is an indication of the user profile characteristics (e.g., demographics, browse history, etc.) 303 corresponding to the user model and representative of the user profiles utilized to develop the user model 306. For example, user model 306(1) includes user profile characteristics 303(1). User model 306(2) includes user profile characteristics 303(2). User model 306(N) includes user profile characteristics 303(N). Likewise, each user model will include one or more campaigns and the predicted short-term user behavior 308 and predicted long-term user behavior 309 that is predicted to be exhibited by users with similar user profiles in response to the recommendation campaigns. For example, user model 1 306(1) includes a list of campaigns 304(1), the predicted short-term user behavior 308(1), and the predicted long-term user behavior 309(1). User model 2 306(2) includes a list of campaigns 304(2), the predicted short-term user behavior 308(2), and the predicted long-term user behavior 309(2). User model N 306(N) includes a list of campaigns 304(N), the predicted short-term user behavior 308(N), and the predicted long-term user behavior 309(N).

While the described implementations illustrate user models with a list of recommendation campaigns and predicted user behaviors, in other implementations, the user models may be used to dynamically generate recommendation campaigns based on an input user profile and desired short-term user behavior and/or desired long-term user behavior. Those of ordinary skill in the pertinent arts will also recognize that any type or form of machine learning system (e.g., hardware and/or software components or modules) may be utilized in accordance with the present disclosure. For example, one or more machine learning algorithms or techniques, including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses may be utilized alone or in combination to develop user models, predict short-term user behavior, and/or predict long-term user behavior.

In some implementations, a machine learning system may identify not only a predicted short-term user behavior and/or predicted long-term user behavior but also a confidence interval, confidence level or other measure or metric of a probability or likelihood that the predicted short-term user behavior and/or predicted long-term user behavior will be exhibited by a user associated with a user profile in response to a particular recommendation campaign. Where the machine learning system is trained using a sufficiently large corpus of user profiles, recommendation campaigns, actual short-term user behavior, and actual long-term user behavior, the confidence interval associated with the predicted short-term user behavior and predicted long-term user behavior may be substantially high.

In accordance with the present disclosure, a trained machine learning system may be used to develop user models of similar user profiles based on the user profile characteristics and how users associated with those user profiles behaved during the short-term and/or long-term in response to various recommendation campaigns. Based on such user models, recommendation campaigns for a user having a similar user profile may be generated to produce a desired short-term user behavior and/or a desired long-term user behavior. The recommendation service may then facilitate execution of the recommendation campaign by sending to respective client devices associated with the user, communications for presentation to the user corresponding to the generated recommendation campaign.

Referring to FIG. 4, illustrated is the trained machine learning system of a recommendation service 410 receiving inputs of a user profile 401 and desired user behavior information 406. In this example, the user profile 401 for User A may indicate a communication preference 401(1) of push type communications, a current website visit frequency 401(2) by User A of 1 day per week, an object interaction 401(3) with objects on the website by User A of 20% of the time the user visits the website, and an object share 401(4) of 0% by User A when the user visits the website.

Likewise, the desired user behavior input 406 into the machine learning system of the recommendation service 410 may specify a desired short-term user behavior 406(1) of 50% interaction by User A with the communication sent by the recommendation service and a desired long-term user behavior 406(2) of 3 days per week that User A visits the website. Indicating a desired short-term user behavior of interaction with 50% of the communications and a desired long-term user behavior of three days during the long-term range in which the user interacts with a particular website, such as a website corresponding to the communications and/or associated with the recommendation service. Any variety and/or type of desired short-term user behaviors may be specified. For example, desired short-term user behaviors may include, but are not limited to, any one or more of interaction rate with communications, website access frequency, object identifier view frequency, duration of time during a session accessing a website, number of object identifiers interacted with during a session, an object identifier share frequency, a purchase frequency, revenue generation, etc. Likewise, any variety and/or type of desired long-term user behaviors may be specified. For example, desired long-term user behaviors may include, but are not limited to, a website access frequency during the long-term range, an object identifier view frequency during the long-term range, an object identifier share frequency during the long-term range, an object identifier save frequency during the long-term range, an object identifier interaction rate during the long-term range, duration of time during the long-term range a website is accessed, number of object identifiers interacted with during the long-term range, a purchase frequency during the long term range, an amount of revenue generated from the user during the long-term range, etc. For example, the described implementations may be optimized based on a revenue potential, during the short-term and/or long-term, from a user. For example, the described implementations may generate a recommendation campaign that will recommend a communication frequency, type, etc., for a user to encourage an increase in revenue produced from that user during the short-term range and/or long-term range.

In some implementations, rather than or in addition to optimizing for a desired user behavior(s) during the short-term range and/or the long-term range, in some implementations one or more constraints may be specified. For example, a constraint, such as sending no more than three communications during the campaign to a particular user, may be provided to the trained machine learning system and the trained machine learning system will generate a recommendation campaign that considers the constraint. For example, rather than providing desired user behavior as an input, the input may specify a desired volume, type, and channel of communications for a particular user. The trained machine learning system will determine a user model representative of the user and determine, based on the provided constraints, the predicted short-term user behavior and predicted long-term user behavior that is predicted to occur based on the constraint inputs.

In some implementations, constraints may be at a user level and/or an aggregate level. For example, a constraint may specify a maximum total volume of communications that can be sent by the system during a given period of time (e.g., twenty-four hours). Based on the provided constraint, the described implementations will balance the volume of communications among different recommendation campaigns for different users to achieve the desired short-term user behaviors and desired long-term user behaviors while complying with the provided constraints.

Returning to FIG. 4, in response to receiving the inputs of the user profile 401 and the desired user behaviors 406, the trained machine learning system of the recommendation service determines a user model of the plurality of user models generated during training that is representative of the user profile 401 and generates a recommendation campaign 402 that includes, for example, recommendation details and an indication of the predicted short-term user behavior 404 and the predicted long-term user behavior 405. As discussed above, the recommendation campaign is generated to encourage a predicted short-term user behavior 404 and a predicted long-term user behavior 405 for the user that is similar to the input desired user behavior 406. In some implementations one or both of the predicted short-term user behavior 404 or the predicted long-term user behavior 405 may not be the same as the desired short-term user behavior 406(1) or the desired long-term user behavior 406(2) that is provided as the input. In such instances, the machine learning system may generate a recommendation campaign 402 that provides a balance between the desired short-term user behavior and the desired long-term user behavior. For example, the desired long-term user behavior may be determined to be more important than the desired short-term user behavior so the machine learning system may weight different details of the recommendation campaign to further correlate the predicted long-term user behavior with the desired long-term user behavior.

Based on the received inputs, the machine learning system determines a user model that is representative of other users with user profile characteristics similar to the characteristics 401(1), 401(2), 401(3), and 401(4) associated with the user profile 401 of User A. Based on the selected user model, a recommendation campaign is generated that is predicted to produce a short-term user behavior 404 and a long-term user behavior 405 that is similar to the input desired user behaviors 406. In this example, based on the selected user model information produced during training of the machine learning system, it is determined for User A that a recommendation campaign 402 that utilizes push type notifications as the communication channel 402(1), that are sent with a frequency 402(2) of three days per week, at times of day 402(3) that are randomly selected, on the days of the week 402(4) of Monday, Wednesday, and Friday, and having a content type 402(5) relating to automobiles, will result in a predicted short-term user behavior 404 and a predicted long-term user behavior 405 by User A that is similar to the input desired user behaviors 406. Specifically, in this example, based on the selected user model, the machine learning system predicts that the recommendation campaign 402 will produce a short-term user behavior 404 that includes a communication interaction 404(1) by User A with 66% of the communications, a website visit frequency 404(2) of two times during the short-term range by User A, an object interaction 404(3) frequency of 50% by User A when the user visits the website during the short-term range, and an object share 404(4) by User A of 33% when the user visits the website during the short-term range. Likewise, the machine learning system predicts a long-term user behavior 405 of a website visit frequency 405(1) of three days per week during the long-term range, an object interaction 405(2) of 40% of the time the user is visiting the website during the long-term range, and an object share frequency 405(3) of 15% of the time the user visits the website during the long-term range.

As will be appreciated, additional or fewer information may be included with the user profile 401 input, the desired user behavior input 406, and/or other inputs. For example, an input specifying the short-term range and/or the long-term range may also be provided. Likewise, additional and/or different user profile information may also be included as the input information that is provided to the machine learning system and utilized to determine a user model that is utilized to generate a recommendation campaign.

Figure 5:
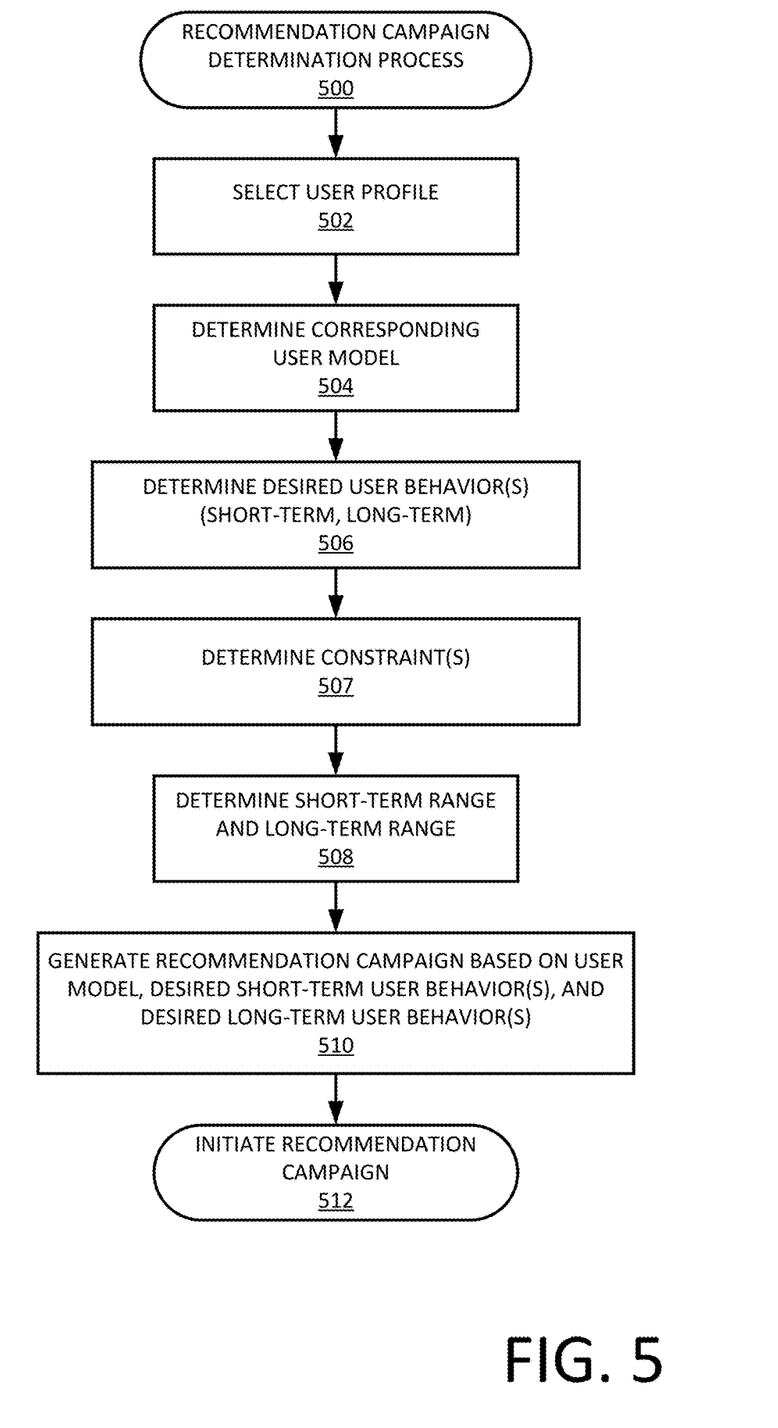
FIG. 5 is an example recommendation campaign determination process, in accordance with described implementations.

FIG. 5 is an example recommendation campaign determination process 500, in accordance with the disclosed implementations. The example process 500 begins by selecting a user profile for which a recommendation campaign is to be generated, as in 502. In some implementations, the example process may periodically and/or sequentially select a user or a group of similar users and generate a recommendation campaign. In other implementations, a user may be selected in response to one or more activities, or lack of activities by the user. For example, when a user first visits a website, joins a mailing list, subscribes to a website, or otherwise has a user profile generated, the example process 500 may be performed. In other implementations, if a user's activity has decreased (lack of activity) over a period of time, the example process 500 may be performed to generate a recommendation campaign that will encourage the user to increase their user activity, but reduce the risk/potential that the user will further decrease activity or unsubscribe in response to the communications sent to the user as part of the recommendation campaign.

Upon selection of a user profile, a user model generated by the machine learning system that mostly closely corresponds to the user profile associated with the selected user is determined, as in 504. For example, different characteristics of the user profile may be compared with characteristics of different user models generated by the machine to determine a user model that mostly closely corresponds to the user model of the selected user.

In addition to determining a user model corresponding to the user profile, a desired short-term user behavior and a desired long-term user behavior are determined or received as inputs, as in 506. In some implementations, the desired short-term user behavior and desired long-term user behavior may be specified in advance and/or be based on a percentage increase of the current user behavior, as specified by the user profile. In other implementations, the desired short-term user behavior and/or desired long-term user behavior may be provided as an input to the example process 500. In still other examples, the desired long-term user behavior may be specified as having more or less importance than the desired short-term user behavior. For example, in some implementations, a percentage increase of user activity on a website may be specified as the desired long-term user behavior (a percentage increase during the long-term range when compared with the user's current website activity) and the short-term user behavior may be specified as a secondary desire. In such an example, the recommendation campaign may be generated that has the highest confidence of producing the desired long-term user behavior by the user.

In some implementations, the example process may also determine any constraints that that are to be followed for the recommendation campaign, as in 507. As discussed above, rather than or in addition to desired user behaviors, one or more user level constraints and/or aggregate level constraints may be provided or specified for the recommendation campaign. For example, a user level constraint may specify the frequency, channel, type, etc., of communications that are to be provided as part of the recommendation campaign, the duration of the recommendation campaign, when communications are to be provided, etc. Aggregate level constraints may specify, for example, a maximum total number of communications that may be sent by the recommendation service during a period of time, the types of communications that may be sent by the recommendation service, etc.

In addition to determining the desired short-term user behavior and the desired long-term user behavior, in some implementations, the desired short-term range and the desired long-term range are determined, as in 508. In other implementations, one or both of the short-term range and the long-term may be defined. As discussed above, a short-term range may be any defined period of time that occurs after initiation of a recommendation campaign, any defined period of time following completion of a recommendation campaign, or any defined period of time following delivery of a communication that is part of the recommendation campaign. The long-term range may be any defined period of time that begins and ends following a defined period of time after initiation of a recommendation campaign, any defined period of time that begins and ends following a defined period of time after completion of a recommendation campaign, or any defined period of time following a defined period of time after delivery of a communication that is part of the recommendation campaign.

Based on the selected user model, the desired short-term user behavior and the desired long-term user behavior, a recommendation campaign is generated that is predicted to produce a short-term user behavior and a long-term user behavior that are similar to the desired short-term user behavior and long-term user behavior, as in 510. As discussed above, the short-term user behavior and long-term user behavior predicted for the generated recommendation campaign are based on the user models generated by the machine learning system utilizing user profiles and recommendations campaigns as training inputs and actual short-term user behavior and actual long-term user behaviors by those user in response to those recommendation campaigns as training outputs. In addition, as discussed above, the recommendation campaign may indicate any combination, frequency and/or type of communication that may be sent to a user. For example, a generated recommendation campaign for a user to produce a desired short-term user behavior and/or desired long-term user behavior may indicate one or more of a type or types, also referred to as channels, of communication (e.g., electronic mail, push communication, SMS message, MMS message, text message, telephone call, computer based notification, paid advertising communication, in-application message, physical mail communication, etc.) that are to be utilized to send communications for presentation to a user, a frequency of communications to be sent to the user during a recommendation campaign, a day or days of the week in which communications are to be sent to the user, a time or times (or time range) during which communications are to be sent to the user, a location or locations of the user that are to be used to determine when to send communications to the user, a device type in use by the user to determine when to send communications to the user, etc. Likewise, the recommendation campaign may specify the content (subject matter) or contents of the communications that are to be sent to the user. As discussed, each aspect of the recommendation campaign may be determined by a trained machine learning system based on the input user profile, the desired short-term user behavior, and/or the desired long-term user behavior to be exhibited by the user in response to the recommendation campaign.

Finally, upon generation of the recommendation campaign, the recommendation campaign is initiated by sending a first communication of the recommendation campaign for presentation to the user, as in 512. The communication may be sent in any of a variety of forms to any one or more devices associated with or otherwise accessible to the user, all of which may be specified in the recommendation campaign details.

Figure 6:
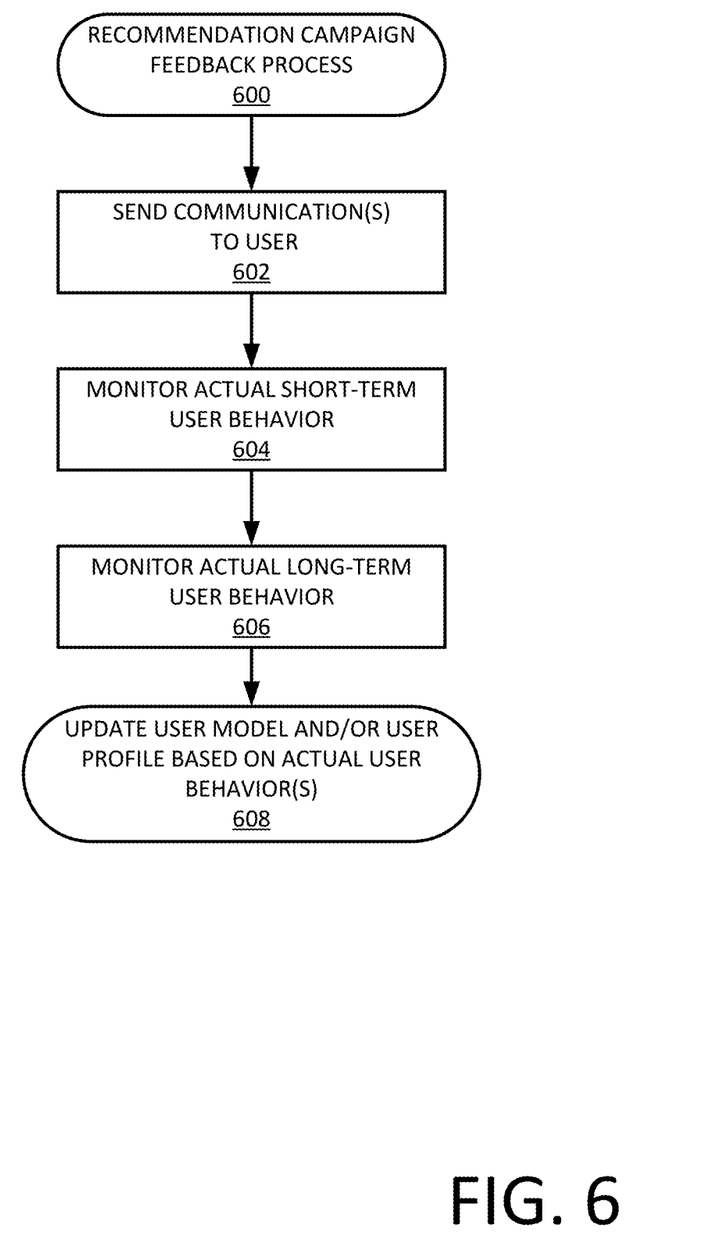
FIG. 6 is an example recommendation campaign feedback process, in accordance with described implementations.

FIG. 6 is an example recommendation campaign feedback process 600, in accordance with described implementations. The example process 600 may be performed as a recommendation campaign is executed and/or upon completion of a recommendation campaign and collection of the actual short-term user behavior and actual long-term user behavior exhibited by the user in response to the recommendation campaign.

As part of the example process 600, the communications specified by the recommendation campaign are sent for presentation to the user, as in 602. Following sending or presentation of the communication(s) to the user, the actual short-term user behavior exhibited by the user during the short-term range is monitored, recorded and associated with the user profile of the user, as in 604. Many different types of short-term user behavior may be monitored and recorded during the short-term range and such activities may depend on the desired short-term user behavior. For example, if the desired short-term user behavior relates to user interaction with the communications, it may be monitored whether the user interacts with the communication(s). As is known to those skilled in the art, there are many techniques to monitor and measure a user's interaction, or lack thereof, with a communication, such as an e-mail message. For example, a URL included in an electronic message may include a reference code that is tracked and sent back to the recommendation service when the user selects the URL. As another example, some e-mail systems may be configured to send a read receipt back to the recommendation service when the e-mail message is viewed by the user. Many other techniques also exist, and are known to those skilled in the art. Other user behaviors that may be monitored and recorded during the short-term range include, but are not limited to, user access of a website, sharing of the communications, posting to the website, commenting on the website, sharing object identifiers, creating object identifiers, viewing object identifiers, etc.

In addition to monitoring the actual short-term user behavior, when the long-term range is reached, the actual long-term user behavior is monitored, recorded, and associated with the user profile during the long-term range, as in 606. Like the actual short-term user behavior, many different types of user activity may be monitored during the long-term range. For example, user interaction with a website, posting to the website, commenting on the website, sharing object identifiers, creating object identifiers, viewing object identifiers, etc., may be monitored and recorded during the long-term range as actual long-term user behavior in response to the recommendation campaign.

Based on the monitored and recorded actual short-term user behavior and the actual long-term user behavior exhibited by the user in response to the recommendation campaign, the user profile and optionally the user model corresponding to the user profile is updated to consider the actual user short-term user behavior and the actual long-term user behavior of the user, as in 608. Updating the user models may be done periodically and then used in future generations of recommendation campaigns. As additional actual user behavior information is collected in response to recommendation campaigns, generated recommendation campaigns become more accurate and adjustments may be made based on changes in user behavior.

Figure 7:
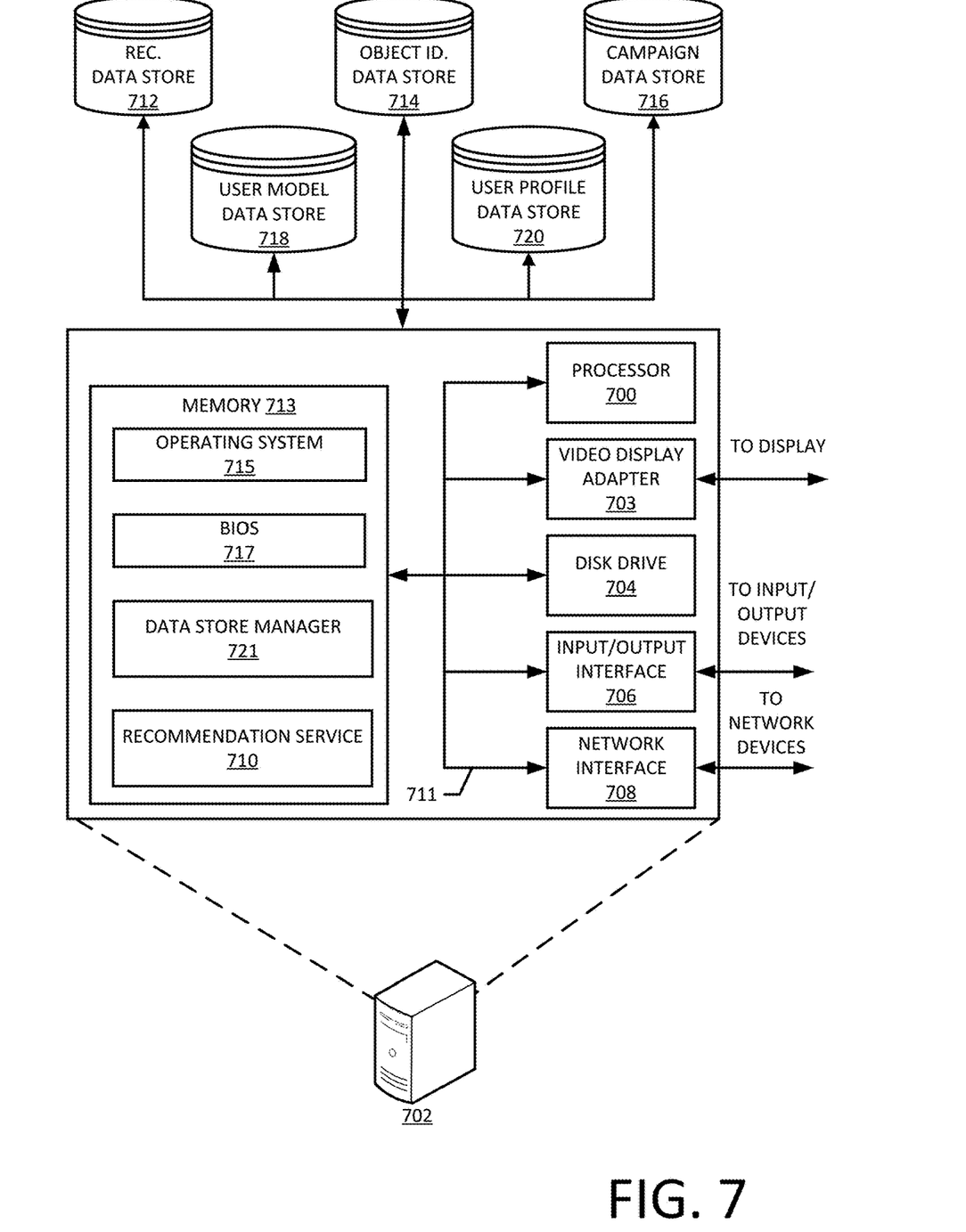
FIG. 7 is a pictorial diagram of an illustrative implementation of a server system that may be used for various implementations.

FIG. 7 is a pictorial diagram of an illustrative implementation of a server system 702, such as the server system 102, that may be used in the environment of FIG. 1. The server system 702 may include a processor 700, such as one or more redundant processors, a video display adapter 703, a disk drive 704, an input/output interface 706, a network interface 708, and a memory 713. The processor 700, the video display adapter 703, the disk drive 704, the input/output interface 706, the network interface 708, and the memory 713 may be communicatively coupled to each other by a communication bus 711.

The video display adapter 703 provides display signals to a local display permitting an operator of the server system 702 to monitor and configure operation of the server system 702. The input/output interface 706 likewise communicates with external input/output devices, such as a mouse, keyboard, scanner, or other input and output devices that can be operated by an operator of the server system 702. The network interface 708 includes hardware, software, or any combination thereof, to communicate with other computing devices. For example, the network interface 708 may be configured to provide communications between the server system 702 and other computing devices, such as the client device 104, via the network 108, as shown in FIG. 1.

The memory 713 generally comprises non-transitory computer-readable memory, such as random access memory (RAM), read-only memory (ROM), flash memory, and/or other volatile or permanent memory. The memory 713 is shown storing an operating system 715 for controlling the operation of the server system 702. A binary input/output system (BIOS) 717 for controlling the low-level operation of the server system 702 is also stored in the memory 713.

The memory 713 additionally stores program code and data for providing network services that allow client devices 104 and third parties 106 to exchange information and data files with the server system 702 and/or the recommendation service 710.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the recommendation data store 712, object identifier data store 714, campaign data store 716, user model data store 718, and/or the user profile data store 720 as needed to execute aspects of one or more applications for the client device 104, the third parties 106 and/or the recommendation service 110.

The data stores 712, 714, 716, 718, and 720 can include several separate data tables, databases or other data storage mechanisms and media for storing data relating to a particular aspect. For example, the data stores 712, 714, 716, 718, and 720 illustrated include mechanisms for storing content, user information, user models and third-party information, user profiles, representations, which can be used to generate and deliver content to client devices 104, such as communications and/or to provide information to the recommendation service 710.

It should be understood that there can be many other aspects that may be stored in the data stores 712, 714, 716, 718, and 720, such as access rights information, which can be stored in any of the above listed mechanisms as appropriate or in additional mechanisms of any of the data stores 712, 714, 716, 718, and 720. The data stores 712, 714, 716, 718, and 720 are operable, through logic associated therewith, to receive instructions from the server system 702, for example, via the data store manager 721, and obtain, update or otherwise process data in response thereto. In one example, a third party might submit a request for a recommendation campaign directed toward specific users or types of users. In this case, the user profile data store 720 and/or the user model data store 718 may be accessed to determine users corresponding to the requested recommendation campaign, and the recommendation service 710 may generate a recommendation campaign for those users based on information maintained in the user model data store 716.

As mentioned, the memory 713 may also include the recommendation service 710, discussed above. The recommendation service 710 may be executable by the processor 700 to implement one or more of the functions of the server system 702. In one implementation, the recommendation service 710 may represent instructions embodied in one or more software programs stored in the memory 713. In another implementation, the recommendation service 710 can represent hardware, software instructions, or a combination thereof.

The server system 702, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction in FIG. 7 should be taken as being illustrative in nature and not limiting to the scope of the disclosure.

The data and/or computer executable instructions, processes, programs, firmware, software and the like (also referred to herein as "computer executable" components) described herein may be stored on a computer-readable medium that is within or accessible by computers or computer components such as the computing resources and having sequences of instructions which, when executed by a processor (e.g., a central processing unit, or "CPU"), cause the processor to perform all or a portion of the functions, services and/or methods described herein. Such computer executable instructions, processes, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user device.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with executable instructions,
maintaining a plurality of user models generated by a trained machine learning system trained using input training data including a plurality of training user profiles and a plurality of training recommendation campaigns and output training data including actual training long-term behavior and actual training short-term behavior and configured to predict short-term behavior and long-term behavior of the plurality of user models, wherein each user model:
includes a predicted short-term behavior generated by the trained machine learning system;
includes a predicted long-term behavior generated by the trained machine learning system;
is representative of a group of users; and
is associated with user profile information representative of the user profiles of the group of users that the user model represents;
selecting a user profile for which a recommendation campaign is to be developed to send communications to a user associated with the user profile on a recurring basis to encourage both a desired short-term user behavior to occur during a short-term range and a desired long-term user behavior to occur during a long-term range, wherein:
the short-term range is a defined period of time that begins after initiation of the recommendation campaign and ends prior to the long-term range; and
the long-term range begins and ends following the defined period of time of the short-term range;
providing the user profile, the desired short-term behavior, and the desired long-term behavior to the trained machine learning system so that:
a user model is selected by the trained machine learning system from the plurality of user models whose user profile information is most similar to user profile information of the user profile associated with the user; and
a recommendation campaign is generated by the trained machine learning system based at least in part on the predicted short-term behavior and the predicted long-term behavior associated with the user model, the desired short-term behavior, and the desired long-term behavior, the recommendation campaign indicating a frequency at which a plurality of communications are to be sent to a user device for presentation to the user to encourage the desired short-term user behavior to occur during the short-term range and the desired long-term user behavior to occur during the long-term range; and
initiating the recommendation campaign by sending a first communication of the plurality of communications to the user device for presentation to the user.

2. The computer-implemented method of claim 1, wherein the desired long-term user behavior is at least one of a website access frequency during the long-term range, an object identifier view frequency during the long-term range, an object identifier share frequency during the long-term range, an object identifier save frequency during the long-term range, an object identifier interaction rate during the long-term range, a duration of time during the long-term range a website is accessed, a number of object identifiers interacted with during the long-term range, an amount of revenue generated by the user during the long-term range, or a purchase frequency during the long-term range.

3. The computer-implemented method of claim 1, wherein the desired short-term user behavior is at least one of an interaction rate with the plurality of communications, a website access frequency, an object identifier view frequency, a duration of time during a session accessing a website, a number of object identifiers interacted with during a session, an object identifier share frequency, a revenue generation during a session, or a purchase frequency.

4. The computer-implemented method of claim 1, wherein sending the communication includes at least one of sending an electronic message, a short message, a multimedia message, a text message, a telephone call, a computer based notification, a paid advertising communication, an in-application message, or a physical mail communication.

5. A system, comprising:
a plurality of user profiles, each user profile including user profile information indicating a behavior of a respective user during a period of time;
one or more processors;
a memory coupled to the one or more processors and storing program instructions that, when executed by the one or more processors, cause the one or more processors to at least:
generate, using a trained machine learning system trained using input training data including the plurality of user profiles and a plurality of training recommendation campaigns and output training data including actual training long-term behavior and actual training short-term behavior, a plurality of user models, wherein each user model:
includes a predicted short-term behavior generated by the trained machine learning system;
includes a predicted long-term behavior generated by the trained machine learning system;
is representative of a group of users; and
is associated with user profile information representative of the user profiles of the group of users that the user model represents;
receive an indication of a first user profile;
provide the first user profile to the trained machine learning system so that the trained machine learning system selects, based at least in part on the first user profile, a first user model from the plurality of user models whose user profile information is most similar to the user profile information of the first user profile;
determine a desired long-term user behavior that is to be encouraged to occur during a long-term range by a user associated with the first user profile, wherein the long-term range begins and ends following a defined period of time of a short-term range, wherein the defined period of time of the short-term range occurs after initiation of a recommendation campaign;

provide the first user profile and the desired long-term user behavior to the trained machine learning system so that the trained machine learning system generates the recommendation campaign, based at least in part on the first user model and the desired long-term user behavior, the recommendation campaign predicted to cause an actual short-term user behavior during the short-term range and an actual long-term user behavior that occurs during the long-term range that relates to the desired long-term user behavior; and initiate the recommendation campaign by sending a first communication for presentation to the user.

6. The system of claim 5, wherein the program instructions, when executed by the one or more processors, further cause the one or more processors to at least:

generate the recommendation campaign based at least in part on the first user model, a desired short-term user behavior, and on the desired long-term user behavior.

7. The system of claim 5, wherein the long-term range begins more than fifteen days after initiation of the recommendation campaign.

8. The system of claim 5, wherein the program instructions, when executed by the one or more processors, further cause the one or more processors to at least:

monitor an actual user behavior in response to the recommendation campaign; and update at least one of the first user profile or the first user model based at least in part on the monitored actual user behavior.

9. The system of claim 8, wherein the actual user behavior includes at least one of an actual short-term user behavior or an actual long-term user behavior.

10. The system of claim 5, wherein the program instructions further cause the one or more processors to at least:

determine a constraint for the recommendation campaign, the constraint indicating at least one of a user level constraint or an aggregate level constraint.

11. A computing system, comprising:
one or more processors; and
a memory coupled to the one or more processors and storing program instructions that when executed by the one or more processors, cause the one or more processors to at least:

maintain a plurality of user models generated by a trained machine learning system using input training data including a plurality of training user profiles and a plurality of training recommendation campaigns and output training data including actual training long-term behavior and actual training short-term behavior, each user model:

including a predicted short-term behavior generated by the trained machine learning system;

including a predicted long-term behavior generated by the trained machine learning system;

being representative of a group of users; and being associated with user profile information representative of user profile information associated with the group of users that the user model represents;

determine a user profile of a user for which a recommendation campaign is to be produced;

provide the user profile to the trained machine learning system so that the trained machine learning system selects, based at least in part on the user profile of the user, a first user model from the plurality of user models whose user profile information is most similar to the user profile information of the user profile;

determine a desired short-term user behavior to encourage to occur during a short-term range, wherein the short-term range is a defined period of time that begins after initiation of the recommendation campaign;

determine a desired long-term user behavior to encourage to occur during a long-term range, wherein the long-term range begins and ends following the defined period of the short-term range;

provide the desired short-term user behavior and the desired long-term user behavior to the trained machine learning system so that the trained machine learning system generates the recommendation campaign for the user profile of the user based at least in part on the predicted short-term behavior and the predicted long-term behavior of the first user model that the recommendation campaign will cause the desired short-term user behavior by the user and the desired long-term user behavior by the user, wherein the user is associated with the user profile; and initiate the recommendation campaign by sending a communication for presentation to the user.

12. The computing system of claim 11, wherein:
the user profile information of the user profile indicates at least a past user behavior of the user associated with the user profile.

13. The computing system of claim 11, wherein the program instructions further cause the one or more processors to at least:

monitor an actual long-term user behavior in response to the recommendation campaign; and update at least one of the user profile or the first user model based at least in part on the actual long-term user behavior.

14. The computing system of claim 11, wherein the program instructions further cause the one or more processors to at least:

determine the long-term range during which the desired long-term user behavior is to be exhibited by the user, wherein the long-term range begins a defined period of time following the recommendation campaign.

15. The computing system of claim 11, wherein:
the desired short-term user behavior includes at least a desired interaction rate with communications of the recommendation campaign; and the desired long-term user behavior includes at least a frequency the user visits a website.

* * * * *